United States Patent

[11] 3,588,153

[72] Inventor Allan H. Willinger
 New Rochelle, N.Y.
[21] Appl. No. 746,802
[22] Filed July 23, 1968
[45] Patented June 28, 1971
[73] Assignee Metaframe Corporation

[54] WIRE-HANDLE-JOINING MEANS
 9 Claims, 5 Drawing Figs.
[52] U.S. Cl. .................................................... 287/78,
 306/45, 43/11
[51] Int. Cl. ..................................................... B25g 1/00
[50] Field of Search ........................................ 43/137, 11;
 287/78; 306/45, 26; 15/141, 154, 206; 16/125

[56] References Cited
UNITED STATES PATENTS

| 1,579,382 | 4/1926 | Mitchell | 15/141 |
| 205,831 | 7/1878 | Brooks | 15/154 |
| 698,065 | 4/1902 | Sims | 43/137UX |
| 1,501,467 | 7/1924 | Rairden | 43/137 |
| 1,662,715 | 3/1928 | Morrow | 306/45 |
| 2,681,822 | 6/1954 | Daniels | 306/45X |
| 3,018,140 | 1/1962 | Portz et al | 306/22 |
| 3,023,535 | 3/1962 | Holka et al. | 24/126UX |
| 3,353,202 | 11/1967 | Winstead et al. | 306/40X |

FOREIGN PATENTS

| 502,172 | 2/1920 | France | 15/141 |
| 544,870 | 4/1942 | Great Britain | 15/206 |

*Primary Examiner*—Thomas F. Callaghan
*Assistant Examiner*—Andrew V. Kundrat
*Attorney*—Friedman & Goodman

ABSTRACT: This invention is directed to means for joining the free ends of a wire handle, such as in a fish net, which comprises a sleeve adapted to overlie said free ends and thus cause them to resultingly be drawn towards each other, and preferably into abutting relation and a locking member adapted to be slidingly secured inside said sleeve so as to lock said ends together.

PATENTED JUN28 1971
3,588,153
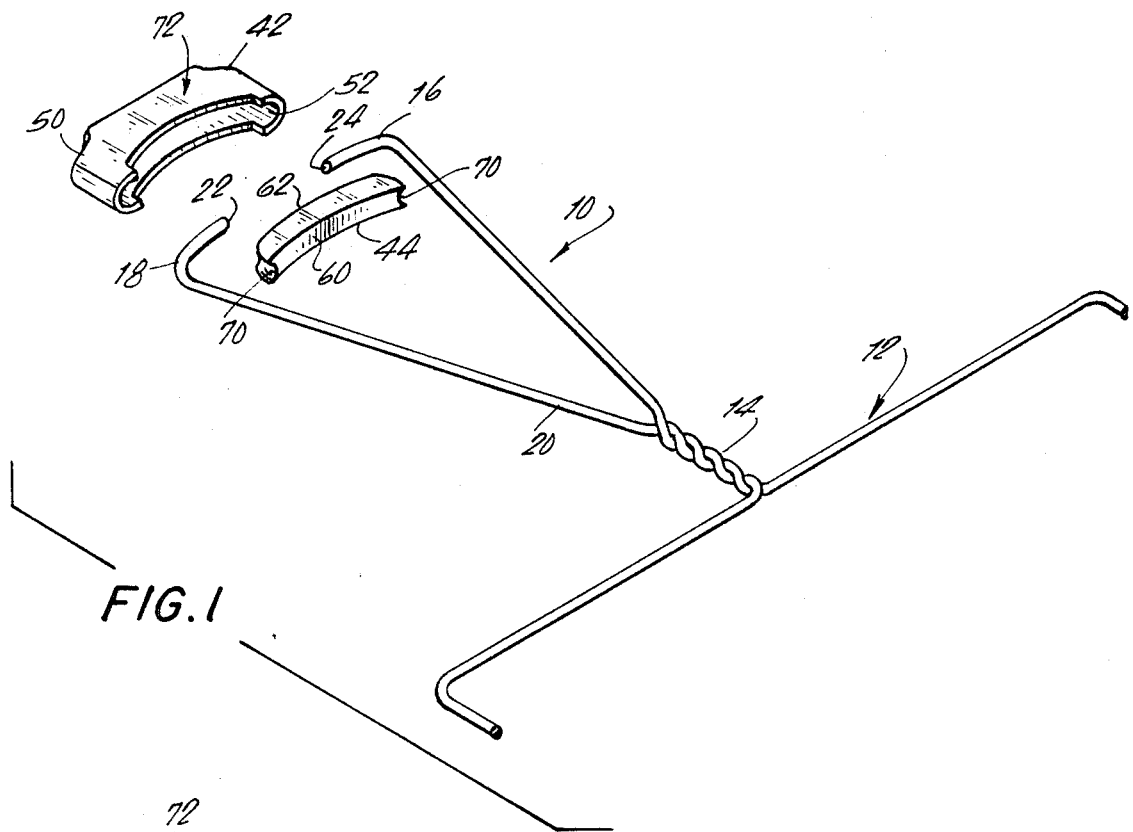
FIG.1
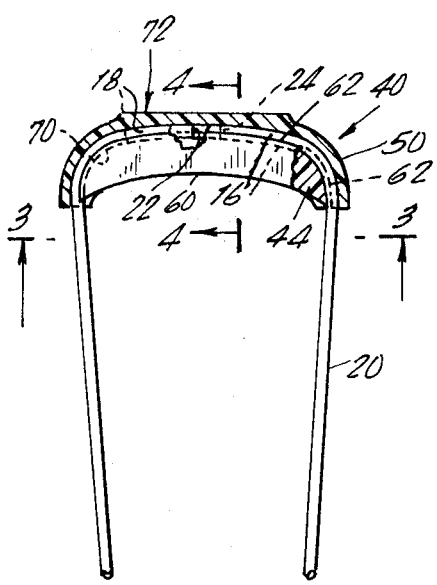
FIG.2
FIG.3
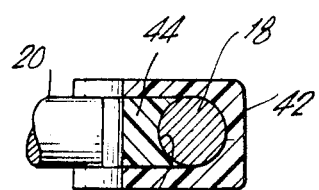
FIG.4
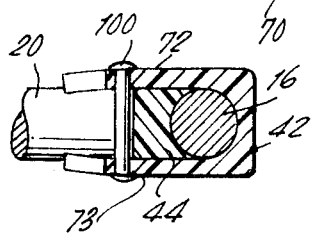
FIG.5
INVENTOR.
ALLAN H. WILLINGER
BY
Friedman & Goodman
ATTORNEYS

WIRE-HANDLE-JOINING MEANS

BACKGROUND OF THE INVENTION

1. Field of the Invention

This invention relates to means for joining the free ends of a wire handle, such as in a fish net.

2. Description of the Prior Art

Usually, the free ends of a wire handle, such as in a fish net or fly swatter are joined together by soldering or welding. However, this is time consuming to accomplish and the resulting welded or soldered spot is unsightly to the eye. Moreover, if the metal wire is plastic coated an even greater problem is presented.

SUMMARY OF THE INVENTION

It is, therefore, among one of the principal objectives of the invention to provide a means for joining the free ends of a wire handle by means other than the actual union of the two ends.

In accordance with the present invention, there is provided a novel means for joining the free ends of a wire handle which comprises a sleeve member adapted to overlie and squeezingly draw the two ends in face-to-face abutment and a locking member adapted to be slidingly secured inside said sleeve member and over said abutting ends thereby rendering said ends in a locked position.

Alternatively, the two ends need not be in face-to-face abutment but may be simply drawn towards each other, in a squeezed manner.

BRIEF DESCRIPTION OF THE DRAWINGS

The invention will be hereinafter more fully described with reference to the accompanying drawings, in which:

FIG. 1 is a view in perspective of wire handle, showing the ends of the handle, the sleeve member and locking member of the invention, all in detached relationship;

FIG. 2 is a top plan view, partially in section and partially cut away, of the handle with all the parts shown in secured relationship;

FIG. 3 is a sectional view taken along line 3–3 of FIG. 2;

FIG. 4 is a sectional view taken along line 4–4 of FIG. 2; and

FIG. 5 is a view similar to FIG. 4 and showing yet another embodiment of the invention.

DESCRIPTION OF THE PREFERRED EMBODIMENTS

Referring now to the FIGS. in the drawings, for purposes of illustration, FIG. 1 depicts a wire handle 10 for a fish net 12, which latter is only partially shown since it is not necessary to include it for the description of the invention, the invention residing in means for joining the wire handle ends together.

As shown, the fish-net 12 and handle 10 are formed of a coil of metal wire 20 twisted as at 14 to form the handle 10 having two free ends 16 and 18 which are each bent at approximate right angles towards each other. Free ends 16 and 18 are in spaced relationship, with respective end faces 22 and 24 thereof also being in spaced relationship.

The spaced ends 16 and 18 are joined together by the invention joining means 40. Joining means 40 comprise a sleeve member 42 and a locking member 44 therefor. Sleeve member 42 and locking member 44 are preferably made of molded plastic material. Sleeve member 42 is a generally curved body 50 which has a hollow interior 52 and is of such size that it will overlie and squeezingly draw the two ends 16 and 18 together, preferably, in face-to-face abutment, when sleeve member 42 is drawn over the two free ends.

When the two ends are inside the hollow interior 52 of sleeve member 42, a locking member 44 having an associatingly curved body 60 and of such shape as to slidingly fit inside sleeve member 42 is fitted over the abutting ends 16 and 18, thereby locking them in place (FIGS. 2—4). The entering front wall 62 of curved body 60 is provided with a channel 70 therearound, so that it will be adapted to smoothly, abuttingly receive the joined ends 16 and 18 and hold them in joined relationship.

Locking member 44 is securely held inside sleeve member 42 either by means of a suitable glue or ultrasonic welding, suitable for securing plastic bodies; or, alternatively, locking member 44 is of such a size that it can be force fitted inside sleeve member 42. In still another embodiment as shown in FIG. 5, locking member 44 is held inside sleeve member 42 by means of a metal eyelet 100 which connects between upper and lower opposing faces 72, 73 of sleeve member 42 and serves to draw faces 72, 73 towards each other, which in turn hold locking member 44 tightly therebetween; also the action of the eyelet 100 drawing the faces 72, 73 towards each other causes the locking member 44 to be forced upwardly against the wire ends 16 and 18 holding them in a still tighter position. It is of course to be understood that the diameter of the wire may vary considerably, and may be plastic coated or uncoated. When the diameter of the wire is thinner, the locking member is pushed in until contact is made with the wire.

The upper face 72 of sleeve member 42 can be inscribed with a decorative or trademark element, if desired.

Describing now the operation of the invention device, in a specific embodiment thereof, a fish net 12 or like article, formed by conventional means and having a wire body 20 whose handle 10 has been formed by twisting the wire body, as at 14, to form two free ends 16, 18 bent at right angles towards each other, has its two free ends 16, 18 joined together by placing the sleeve member 42 up over the free ends 16, 18 thereby squeezingly drawing the end faces 22 and 24 of ends 16 and 18, respectively, into abutment, face to face, the free ends 16, 18 fitting inside hollow interior 52 of sleeve member 42. Thereafter, locking member 44, with suitable glue material, or solvent bonding material, applied is associatingly, curvingly inserted into the hollow 52 up over joined ends 16, 18, the latter being smoothly, abuttingly received by channel 70 of locking member 44, resulting in the rendering of the ends in a locked position.

Thus, there is eliminated by means of the invention the need for time-consuming, unaesthetic, soldering or metal welding, which processes are especially difficult when it is desired to plastic coat the wire metal making up the fish net, or the like, before it is formed into the desired article.

I claim:

1. Means for joining the free ends of a wire handle, said handle having a twisted portion terminating in free ends being bent transversely of the handle and towards each other, comprising a sleeve member receiving said ends therein and engaging said ends in an overlie position with said sleeve member squeezingly holding said ends in face-to-face abutment, and a locking member therefor, said locking member being slidingly secured inside said sleeve member, the end of said locking member smoothly, abuttingly overlying said abutting ends to define a position of said abutting ends being held against the bottom of said sleeve member by the end of said locking member, thereby rendering said ends in a lock position.

2. In a fish net, whose frame is formed of metal wire, the handle of which is formed by twisting the free opposite portions of said wire and bending the free ends thereof transversely of the handle and towards each other, means for joining the free ends of said handle comprising a sleeve member receiving said ends therein and engaging said ends in an overlie position with said sleeve member squeezingly holding said ends in face-to-face abutment, and a locking member therefor, said locking member being slidingly secured inside said sleeve member, the end of said locking member smoothly, abuttingly overlying said abutting ends to define a position of said abutting ends being held against the bottom of said sleeve member by the end of said locking member, thereby rendering said abutting ends in a locked position.

3. A device according to claim 1, wherein said sleeve member further comprises a generally curved molded plastic body having a hollow interior and sized so that it will overlie and squeezingly draw said ends together when said sleeve member is drawn over said ends, said locking member further comprising an associatingly curved molded plastic body of such size as to slidingly fit inside said sleeve member, said locking member being provided with a channel for receiving said abutting ends so that it will smoothly, abuttingly overlie the same, thereby rendering said abutting ends in a locked position.

4. A device according to claim 2, wherein said sleeve member further comprises a generally curved molded plastic body having a hollow interior and sized so that it will overlie and squeezingly draw said ends together when said sleeve member is drawn over said ends, said locking member further comprising an associatingly curved molded plastic body of such size as to slidingly fit inside said sleeve member, said locking member being provided with a channel for receiving said abutting ends so that it will smoothly, abuttingly overlie the same, thereby rendering said abutting ends in a locked position.

5. Means for joining the free ends of a wire handle, said free ends being bent towards each other, comprising a sleeve member adapted to overlie and squeezingly draw the said ends in face-to-face abutment and a locking member therefor, said locking member being adapted to be slidingly secured inside said sleeve member and to smoothly, abuttingly overlie said abutting ends thereby rendering said ends in a locked position, said sleeve member further comprising a generally curved molded plastic body having a hollow interior and sized so that it will overlie and squeezingly draw said ends together when said sleeve member is drawn over said ends, said locking member further comprising an associatingly curved molded plastic body of such size as to slidingly fit inside said sleeve member, said locking member being provided with a channel for receiving said abutting ends so that it will smoothly, abuttingly overlie the same, wherein said locking member is glued inside said sleeve member.

6. A device according to claim 3, wherein said locking member is force fitted inside said sleeve member.

7. In a fish net, whose frame is formed of metal wire, the handle of which is formed by twisting the free opposite portions of said wire and bending the free ends thereof towards each other, means for joining the free ends of said handle comprising a sleeve member adapted to overlie and squeezingly draw the said ends in face-to-face abutment and a locking member therefor, said locking member being adapted to be slidingly secured inside said sleeve member and to smoothly, abuttingly overlie said abutting ends thereby rendering said abutting ends in a locked position, said sleeve member further comprising a generally curved molded plastic body having a hollow interior and sized so that it will overlie and squeezingly draw said ends together when said sleeve member is drawn over said ends, said locking member further comprising an associatingly curved molded plastic body of such size as to slidingly fit inside said sleeve member, said locking member being provided with a channel for receiving said abutting ends so that it will smoothly, abuttingly overlie the same, wherein said locking member is glued inside said sleeve member.

8. Means for joining the free ends of a wire handle, said free ends being bent towards each other, comprising a sleeve member adapted to overlie and squeezingly draw the said ends in face-to-face abutment and a locking member therefor, said locking member being adapted to be slidingly secured inside said sleeve member and to smoothly, abuttingly overlie said abutting ends thereby rendering said ends in a locked position, said sleeve member further comprising a generally curved molded plastic body having interior and sized so that it will overlie and squeezingly draw said ends together when said sleeve member is drawn over said ends, said locking member further comprising an associatingly curved molded plastic body of such size as to slidingly fit inside said sleeve member, said locking member being provided with a channel for receiving said abutting ends so that it will smoothly, abuttingly overlie the same, wherein said locking member is solvent bonded inside said sleeve member.

9. In a fish net, whose frame is formed of metal wire, the handle of which is formed by twisting the free opposite portions of said wire and bending the free ends thereof towards each other, means for joining the free ends of said handle comprising a sleeve member adapted to overlie and squeezingly draw the said ends in face-to-face abutment and a locking member therefor, said locking member being adapted to be slidingly secured inside said sleeve member and to smoothly, abuttingly overlie said abutting ends thereby rendering said abutting ends in a locked position, said sleeve member further comprising a generally curved molded plastic body having a hollow interior and sized so that it will overlie and squeezingly draw said ends together when said sleeve member is drawn over said ends, said locking member further comprising an associatingly curved molded plastic body of such size as to slidingly fit inside said sleeve member, said locking member being provided with a channel for receiving said abutting ends so that it will smoothly, abuttingly overlie the same, wherein said locking member is solvent bonded inside said sleeve member.